(12) United States Patent
Babbar et al.

(10) Patent No.: US 7,986,670 B2
(45) Date of Patent: *Jul. 26, 2011

(54) DYNAMIC CONFIGURATION OF IP FOR A TERMINAL EQUIPMENT ATTACHED TO A WIRELESS DEVICE

(75) Inventors: Uppinder S. Babbar, San Diego, CA (US); Phil J. Bostley, Boulder, CO (US); Christopher L. Platt, Ongmont, CO (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 12/466,314

(22) Filed: May 14, 2009

(65) Prior Publication Data
US 2009/0219834 A1 Sep. 3, 2009

Related U.S. Application Data

(63) Continuation of application No. 10/882,522, filed on Jun. 30, 2004, now Pat. No. 7,548,523.

(51) Int. Cl.
*H04Q 7/00* (2006.01)

(52) U.S. Cl. ...... 370/331; 370/351; 455/445; 455/432.1

(58) Field of Classification Search .......... 370/331, 370/352; 455/445, 432.1
See application file for complete search history.

(56) References Cited

U.S. PATENT DOCUMENTS

| 6,751,459 B1 * | 6/2004 | Lee et al. ............. 455/445 |
| 2001/0032237 A1 * | 10/2001 | Miyake et al. ......... 709/203 |
| 2008/0019319 A1 * | 1/2008 | Bahini et al. .......... 370/331 |

* cited by examiner

*Primary Examiner* — Creighton Smith
(74) *Attorney, Agent, or Firm* — Kristine U. Ekwueme

(57) ABSTRACT

Techniques for dynamically configuring IP and providing IP connectivity for a terminal equipment attached to a wireless device are described. The wireless device obtains from a wireless network a dynamically assigned IP address, an IP gateway's IP address, a subnet mask, or none or any combination thereof. Wireless device determines a host IP address (which may be the dynamically assigned IP address), a router IP address (which may be the gateway IP address or a spoofed IP address), a server IP address (which may be the router IP address), and a subnet mask (which may be obtained from the wireless network or spoofed by the wireless device). Wireless device, acting as a DHCP server, provides IP configuration for the terminal equipment, acting as a DHCP client. Wireless device thereafter forwards IP packets exchanged between the terminal equipment and wireless network and processes DHCP packets from the terminal equipment.

18 Claims, 8 Drawing Sheets

DYNAMIC CONFIGURATION OF IP FOR A TERMINAL EQUIPMENT ATTACHED TO A WIRELESS DEVICE

CLAIM OF PRIORITY

The present application is a continuation of U.S. patent application Ser. No. 10/882,522 filed on Jun. 30, 2004, entitled "Dynamic Configuration of IP for a Terminal Equipment Attached to a Wireless Device," now allowed, assigned to the assignee hereof and expressly incorporated by reference herein.

BACKGROUND

1. Field

The present invention relates generally to data communication, and more specifically to techniques for dynamically configuring Internet Protocol (IP) for a terminal equipment attached to a wireless device.

2. Background

IP is a protocol that supports transmission of blocks of data, called datagrams, from source hosts to destination hosts in a packet-switched data network. In IP terminology, a "node" is a device that implements IP, a "host" is a node that terminates IP packets explicitly addressed to itself, and a "router" is a host that also forwards IP packets not explicitly addressed to itself. The source and destination hosts are identified by fixed length IP addresses.

In a local area network (LAN), a terminal equipment (e.g., a computer) typically interacts with a Dynamic Host Configuration Protocol (DHCP) server to obtain IP configuration needed to communicate with other hosts via IP. Such IP configuration may include, for example, an IP address for the terminal equipment, an IP address of a router to which the terminal equipment may send IP packets for forwarding to other hosts, and so on. The procedure for obtaining IP configuration is described in a document RFC 2131, entitled "Dynamic Host Configuration Protocol," which is publicly available.

A terminal equipment may be attached or coupled to a wireless device (e.g., a cellular phone) to obtain IP connectivity via a wireless network (e.g., a cellular communication network). As used herein, IP connectivity refers to the ability to transmit and receive IP packets. The wireless network may support IP packet transmission but may not directly support DHCP, which is often the case for many wireless networks currently deployed. In this case, the terminal equipment would not be able to communicate with a DHCP server in the wireless network to obtain configuration information needed for IP.

There is therefore a need in the art for techniques to support dynamic configuration of IP for a terminal equipment coupled to a wireless device that is in communication with a wireless network, which does not directly support DHCP.

SUMMARY

Techniques for dynamically configuring IP for a terminal equipment coupled or attached to a device and for providing IP connectivity for the terminal equipment via a network are described herein. The device may be a wireline or wireless device, and the network may be a wireless or wireline network. For dynamic configuration of IP for the terminal equipment, the wireless device obtains IP configuration from the wireless network, e.g., by performing a network-specific procedure with the wireless network. The IP configuration obtained from the wireless network may include (1) a dynamic IP address assigned by the wireless network to the wireless device for use in a data session (which is called the "host" IP address), (2) an IP address for an IP gateway within the wireless network (which is called the "gateway" IP address), (3) a mask for a subnet on which the host IP address belongs (which is called the "subnet mask"), or (4) none, any one, or any combination of the above items. The wireless device spoofs (i.e., makes up or fakes) a subnet mask if one is not obtained from the wireless network. The wireless device also determines an IP address for a router within the subnet, which is called the "router" IP address and may be used by the terminal equipment to send IP packets to other hosts located outside of the subnet. The router IP address may be (1) the gateway IP address, if obtained from the wireless network and belonging in the same subnet as the host IP address, or (2) an IP address spoofed by the wireless device. The wireless device, acting as a DHCP server, provides IP configuration for the terminal equipment, acting as a DHCP client.

The wireless device thereafter acts as both the router and DHCP server and supports IP connectivity for the terminal equipment. The wireless device receives IP packets from the terminal equipment, performs IP packet filtering on the received IP packets to detect for IP packets intended for the DHCP server (which are called "DHCP" packets), processes DHCP packets at the wireless device, and forwards all other IP packets toward the wireless network. The wireless device also receives IP packets from the wireless network and forwards these IP packets toward the terminal equipment. The processing by the wireless device allows the terminal equipment to operate in the normal manner, as if in a LAN environment, even though the terminal equipment is obtaining IP connectivity via the wireless network.

In one embodiment, a method is presented for providing Internet Protocol (IP) connectivity for a terminal equipment coupled to a wireless device that is in communication with a wireless network, the method comprising: determining a host IP address, a router IP address, and a subnet mask, the subnet mask being used to determine a subnet to which the host IP address belongs, the host IP address being an IP address assigned to the terminal equipment and used to send IP packets to the terminal equipment, and the router IP address being an IP address used by the terminal equipment to send IP packets to nodes outside of the subnet; and providing the host IP address, the router IP address, and the subnet mask to the terminal equipment, wherein the host IP address, router IP address, and subnet mask are used by the terminal equipment to exchange IP packets.

In another embodiment, a method is presented for providing Internet Protocol (IP) connectivity for a terminal equipment coupled to a device that is in communication with a network, comprising: determining a host IP address, which is an IP address to be assigned to the terminal equipment and used to send IP packets to the terminal equipment; deriving a router IP address, a subnet mask, or both the router IP address and the subnet mask, the subnet mask being used to determine a subnet to which the host IP address belongs, and the router IP address being an IP address used by the terminal equipment to send IP packets outside of the subnet; and providing the host IP address, the router IP address, and the subnet mask to the terminal equipment, wherein the host IP address, router IP address, and subnet mask are used by the terminal equipment to exchange IP packets.

In another embodiment, apparatus is presented that is operable to provide Internet Protocol (IP) connectivity for a terminal equipment via a wireless network, comprising: a controller operable to determine a host IP address, a router IP address, and a subnet mask, the subnet mask being used to determine a subnet to which the host IP address belongs, the host IP address being an IP address assigned to the terminal equipment and used to send IP packets to the terminal equipment, and the router IP address being an IP address used by the terminal equipment to send IP packets outside of the subnet; and provide the host IP address, the router IP address, and the subnet mask to the terminal equipment, and wherein the host IP address, router IP address, and subnet mask are used by the terminal equipment to exchange IP packets.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
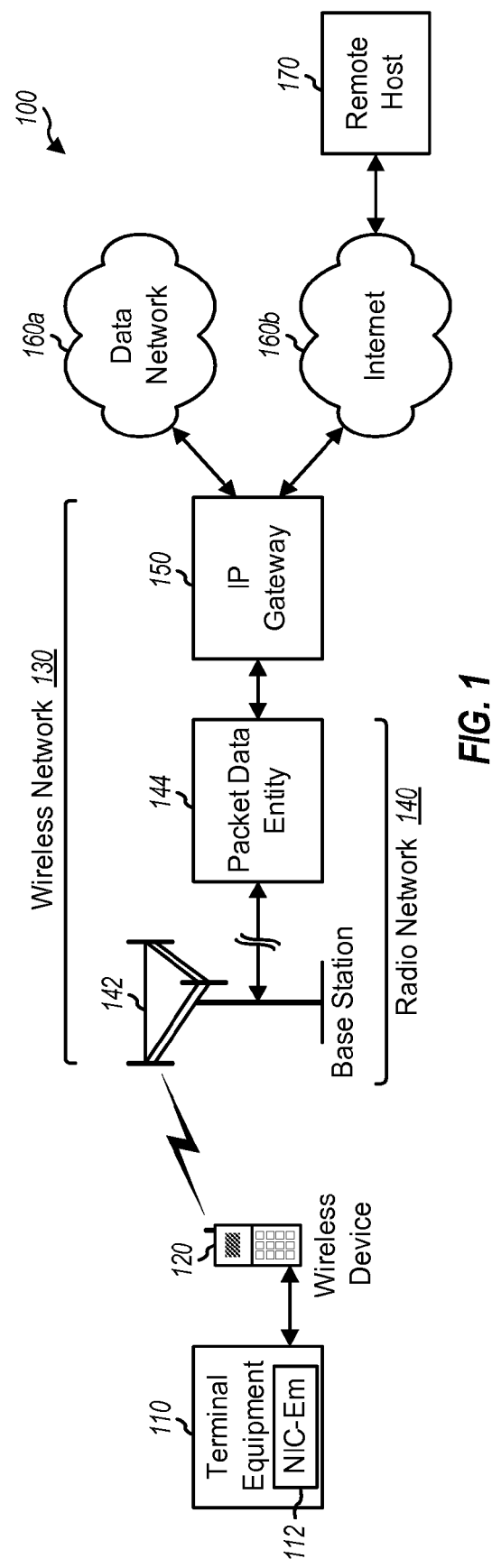
FIG. 1 shows a terminal equipment, a wireless device, and a wireless network.

FIG. 1 shows a deployment 100 in which a wireless device 120 communicates with a wireless network 130 to obtain IP connectivity and various other services. Wireless device 120 may be a cellular phone, a modem card, or some other wireless communication unit or device. Wireless device 120 may also be referred to as a mobile station (MS), a user equipment (UE), a user terminal, or some other terminology. Wireless network 130 includes a base station 142, a packet data entity 144, and an IP gateway 150. Base station 142 provides over-the-air communication with wireless device 120. Packet data entity 144 controls the transmission of packets between base station 142 and IP gateway 150. IP gateway 150 supports data services for wireless devices in wireless network 130. For example, IP gateway 150 may be responsible for the establishment, maintenance, and termination of PPP (Point-to-Point Protocol) sessions for the wireless devices. IP gateway 150 may also function as a DHCP server that can assign dynamic IP addresses to wireless devices. IP gateway 150 may couple to the Internet 160b and/or other data networks (e.g., a data network 160a) and can communicate with various entities (e.g., a remote host 170) that couple to these networks.

Wireless network 130 may also be viewed as being composed of a radio network 140 and a packet data network. Radio network 140 includes base station 142 and packet data entity 144 and supports over-the-air communication, e.g., for circuit-switched and packet-switched communication. The packet data network includes IP gateway 150 and supports packet-switched communication between radio network 140 and external networks.

Wireless network 130 may be a Code Division Multiple Access (CDMA) network that may implement one or more CDMA standards adopted by a consortium known as 3GPP2. These CDMA standards include IS-2000, IS-856, and IS-95. In a 3GPP2-based wireless network, packet data entity 144 is referred to as a Packet Control Function (PCF), and IP gateway 150 is referred to as a Packet Data Serving Node (PDSN). Wireless network 130 may also be a Universal Mobile Telecommunications System (UMTS) network that may implement one or more standards adopted by a consortium known as 3GPP. For example, a UMTS network may utilize Wideband-CDMA (W-CDMA) or Global System for Mobile Communications (GSM) for air interface and General Packet Radio Service (GPRS) or Enhanced Data rates for Global Evolution (EDGE) for the packet data network. In a UMTS network, packet data entity 144 is referred to as a Serving GPRS Support Node (SGSN), and IP gateway 150 is referred to as a Gateway GPRS Support Node (GGSN). Wireless network 130 may also be a wireless local area network (WLAN) that provides communication coverage for a limited geographic area. For example, wireless network 130 may be (1) an IEEE 802.11 network that implements an IEEE 802.11 standard (e.g., 802.11a, b, g, and so on) or (2) a Bluetooth personal area network (BT-PAN) that employs Bluetooth wireless technology. In general, wireless network 130 may be a wireless wide area network (WWAN) (e.g., a CDMA or UMTS network) or a WLAN (e.g., an IEEE 802.11 network or a BT-PAN).

Wireless device 120 may be coupled to a terminal equipment 110 via a wireline connection (as shown in FIG. 1) or a wireless connection. The wireline connection may be via a serial bus such as, for example, a Universal Serial Bus (USB), an RS232/EIA232 interface, a Personal Computer Memory Card International Association (PCMCIA) interface, an IEEE 1394 bus, and so on. Terminal equipment 110 may be a laptop computer, a personal digital assistant (PDA), or some other electronic unit or device. In this "attached" configuration, a wireless user can obtain data services (e.g., IP connectivity) via terminal equipment 110. To provide the data services, terminal equipment 110 communicates with wireless device 120, which further communicates with wireless network 130. Wireless device 120 provides over-the-air communication for a data call to obtain the desired data services, and terminal equipment 110 supports end-to-end communication for the desired data services.

Figure 2:
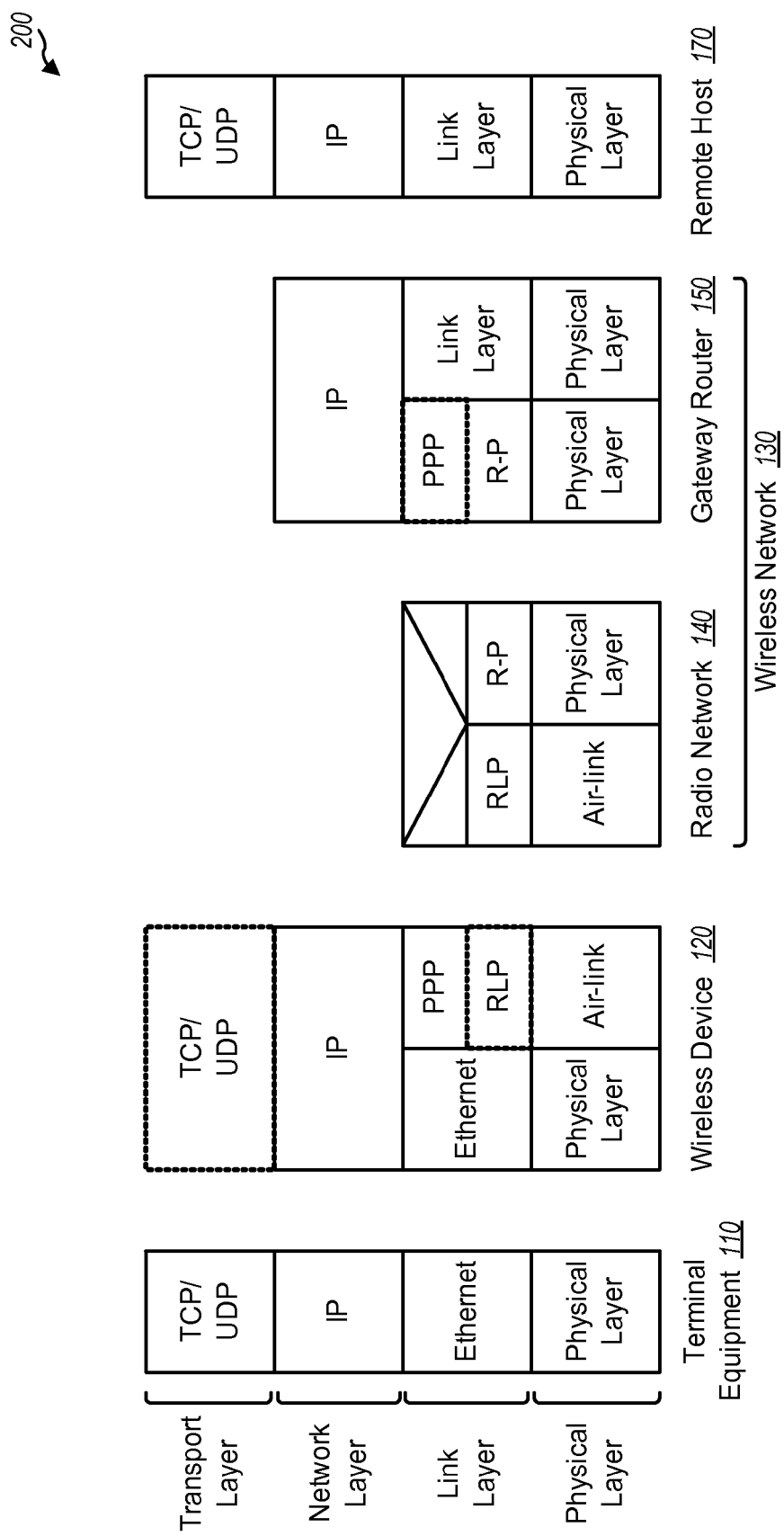
FIG. 2 shows a protocol stack for a data exchange between the terminal equipment and a remote host, via the wireless device and wireless network.

FIG. 2 shows an exemplary protocol stack 200 for a data exchange between terminal equipment 110 and remote host 170, via wireless device 120 and wireless network 130. The protocol stack includes a transport layer that operates on top of a network layer, which operates on top of a link layer, which further operates on top of a physical layer. Terminal equipment 110 and remote host 170 may communicate via a Transmission Control Protocol (TCP), a User Datagram Protocol (UDP), or some other protocol at the transport layer. TCP and UDP, which are well known in the art, typically operate on top of IP at the network layer. Transport layer data (e.g., for TCP and/or UDP) is encapsulated in IP packets, which are exchanged between terminal equipment 110 and remote host 170 via wireless device 120, radio network 140, and IP gateway 150.

The link layer between terminal equipment 110 and wireless device 120 may be Ethernet or some other protocol. In general, terminal equipment 110 and wireless device 120 may communicate over any LAN-type environment and may use any link layer protocol such as, for example, token ring, token bus, and so on, as described in the IEEE 802 family of standards. For clarity, the following description assumes that terminal equipment 110 and wireless device 120 communicate via IP over Ethernet, which is described in IEEE 802.3. The link layer between wireless device 120 and wireless network 130 is typically dependent on the particular technology employed by the wireless network. For a 3GPP2-based network, the link layer is implemented with a PPP, which operates on top of a Radio Link Protocol (RLP). Wireless device 120 maintains a PPP session with IP gateway 150 for the data session. For data exchanges, wireless device 120 communicates with radio network 140 via RLP, which operates on top of an air-link interface (e.g., IS-2000 or IS-856). Radio network 140 communicates with IP gateway 150 via a technology-dependent interface (e.g., an "R-P" interface for 3GPP2-based network) that operates on top of a physical layer. IP gateway 150 communicates with remote host 170 via IP over a link layer and a physical layer.

Figure 3:
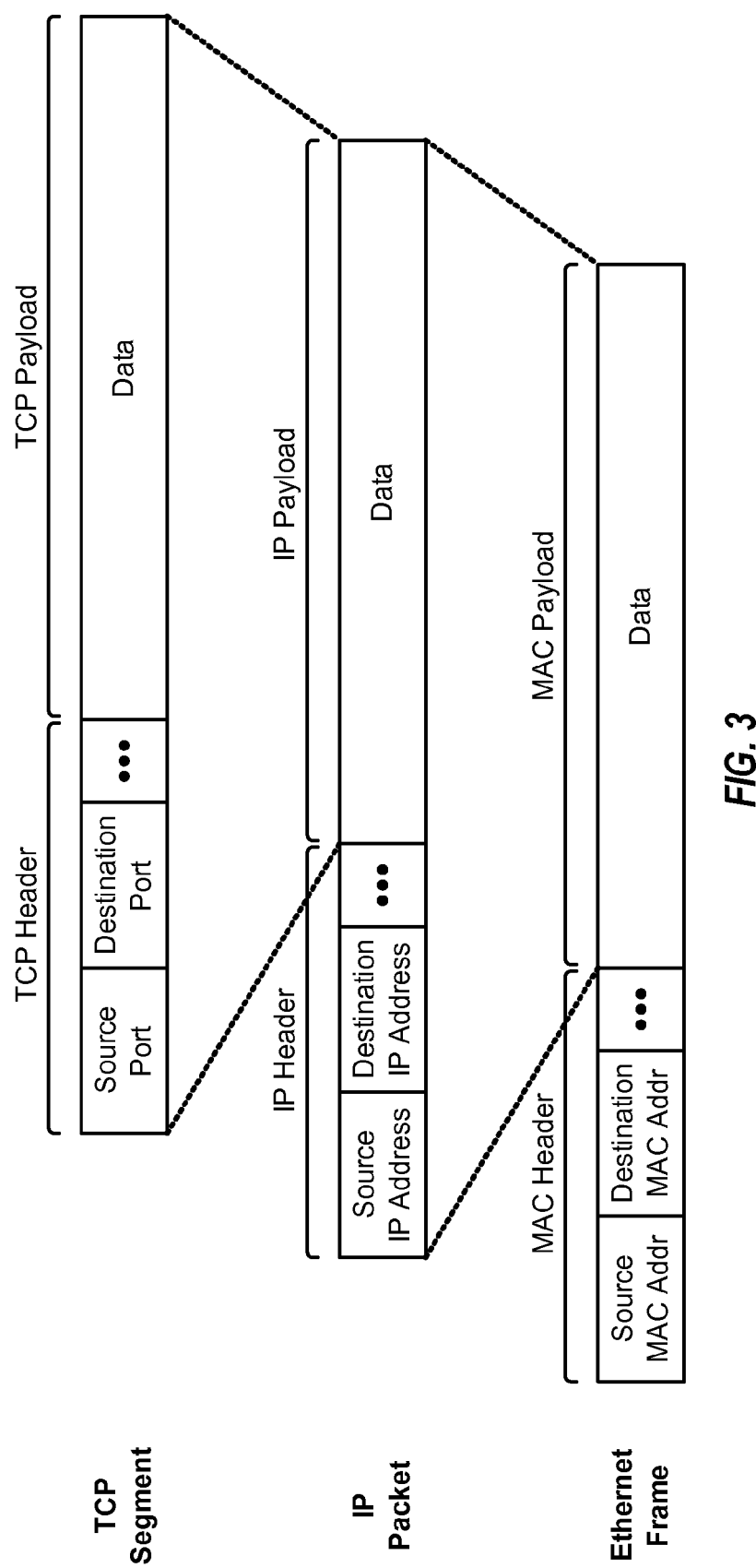
FIG. 3 shows data unit formats for the transport, network, and link layers.

FIG. 3 shows the formats and the encapsulation of data units for the transport, network, and link layers. For TCP at the transport layer, data is sent as TCP segments, with each segment including a TCP header and a TCP payload. The TCP header includes a source port and a destination port, where a port indicates a logical channel associated with the data in the payload. For IP at the network layer, data is sent as IP packets (or datagrams), with each IP packet including an IP header and an IP payload. The IP header includes a source IP address and a destination IP address for a source node and a destination node, respectively, for the IP packet. The IP payload may carry a TCP segment or some other data. For Ethernet at the link layer, data is sent as Ethernet frames, with each frame including a Media Access Control (MAC) header and a MAC payload, as described in the IEEE 802.3. The MAC header includes a source MAC address and a destination MAC address for a source device and a destination device, respectively, for the frame. The MAC payload may carry an IP packet or some other data.

In order for terminal equipment 110 to communicate with remote host 170 via IP, the terminal equipment and remote host are assigned different IP addresses that uniquely identify these hosts at the network layer. Terminal equipment 110 can send data specifically to remote host 170 by using the IP address of the remote host, and vice versa.

An IP address for a node contains 32 bits and is often expressed as: W.X.Y.Z, where W, X, Y, and Z are each an 8-bit value. The IP address may also be expressed as: <Subnet Addr> <Node Addr>, where Node Addr is the address of the node within a sub-network (or simply, a subnet), and Subnet Addr is the address of the subnet. The Subnet Addr and Node Addr collectively contain 32 bits, but each address may contain any number of bits depending on the size of the subnet. For a given subnet address, a node address of all ones ('1') is reserved and used as a broadcast address to send IP packets to all nodes on the subnet.

A subnet mask is used to determine the subnet address of an IP address. The subnet mask has a one ('1') for each bit in the IP address used for the subnet address and a zero ('0') for each bit used for the node address. For example, if the subnet address for a subnet contains L bits, then the 32-bit subnet mask for the subnet would contain L ones for the L most significant bits (msbs) of the mask and 32−L (i.e., 32 minus L) zeros for the 32−L least significant bits (lsbs) of the mask. For example, if the subnet portion of the IP address is 8 bits long, then there will be 8 bits of one ('1') followed by 24 bits of ('0') in the subnet mask. The subnet address of the IP address may be determined by performing an AND logical operation on the IP address with the subnet mask.

Terminal equipment 110 may be equipped with a network interface card emulator (NIC-Em) 112 that supports IP over Ethernet. The NIC-Em may be designed to obtain IP configuration whenever it is connected to a data network or whenever a data session is initiated by a wireless user. The IP configuration obtained by the NIC-Em may include (1) an IP address that the NIC-Em can use as its own IP address (i.e., the host IP address), if the NIC-Em does not already have an IP address, (2) an IP address of a default router on the subnet to which the NIC-Em can send IP packets (i.e., the router IP address), and (3) a mask for the subnet to which the NIC-Em is attached (i.e., the subnet mask). The NIC-Em uses the subnet mask to determine whether a given destination host to which the NIC-Em desires to send data is located within or outside of the subnet. If the destination host is located within the subnet, then the NIC-Em sends IP packets directly to this host using the IP address and MAC address of the host. If the destination host is located outside of the subnet, then the NIC-Em determines the MAC address of the router for this host and then sends IP packets to this host via the router using the MAC address of the router.

For a LAN, the NIC-Em typically obtains IP configuration via a DHCP server. However, as noted above, many wireless networks (e.g., CDMA and GPRS networks) do not directly support DHCP. Thus, if terminal equipment 110 is coupled to wireless device 120 and wireless network 130 does not directly support DHCP, then another mechanism is needed to dynamically configure IP for the terminal equipment.

Wireless device 120 may "spoof" a DHCP server to dynamically configure IP for terminal equipment 110, which may emulate a standard network interface card. For dynamic IP configuration, NIC-Em 112 within terminal equipment 110, acting as a DHCP client, broadcasts a DHCP message to listening DHCP servers. The DHCP message may request for an assignment of a host IP address (if the NIC-Em does not have an IP address), the router IP address, and the subnet mask. Wireless device 120 would act as a DHCP server and provide the requested IP configuration to terminal equipment 110.

Wireless device 120 complies with expected DHCP behavior when spoofing as a DHCP server. The wireless device provides a router IP address that is on the same subnet as the host IP address, which is what the terminal equipment typically expects. The wireless device ensures this even though the IP address of IP gateway 150 (i.e., the gateway IP address) may not have been provided by the wireless network or even if the gateway IP address is not located on the same subnet as the host IP address. The wireless device also ensures that the IP address of the DHCP server, which is being spoofed by the wireless device, is also located on the same subnet as the DHCP client. This avoids the need for a relay agent to advertise the agent's own IP address as the DHCP server's IP address.

Figure 4:
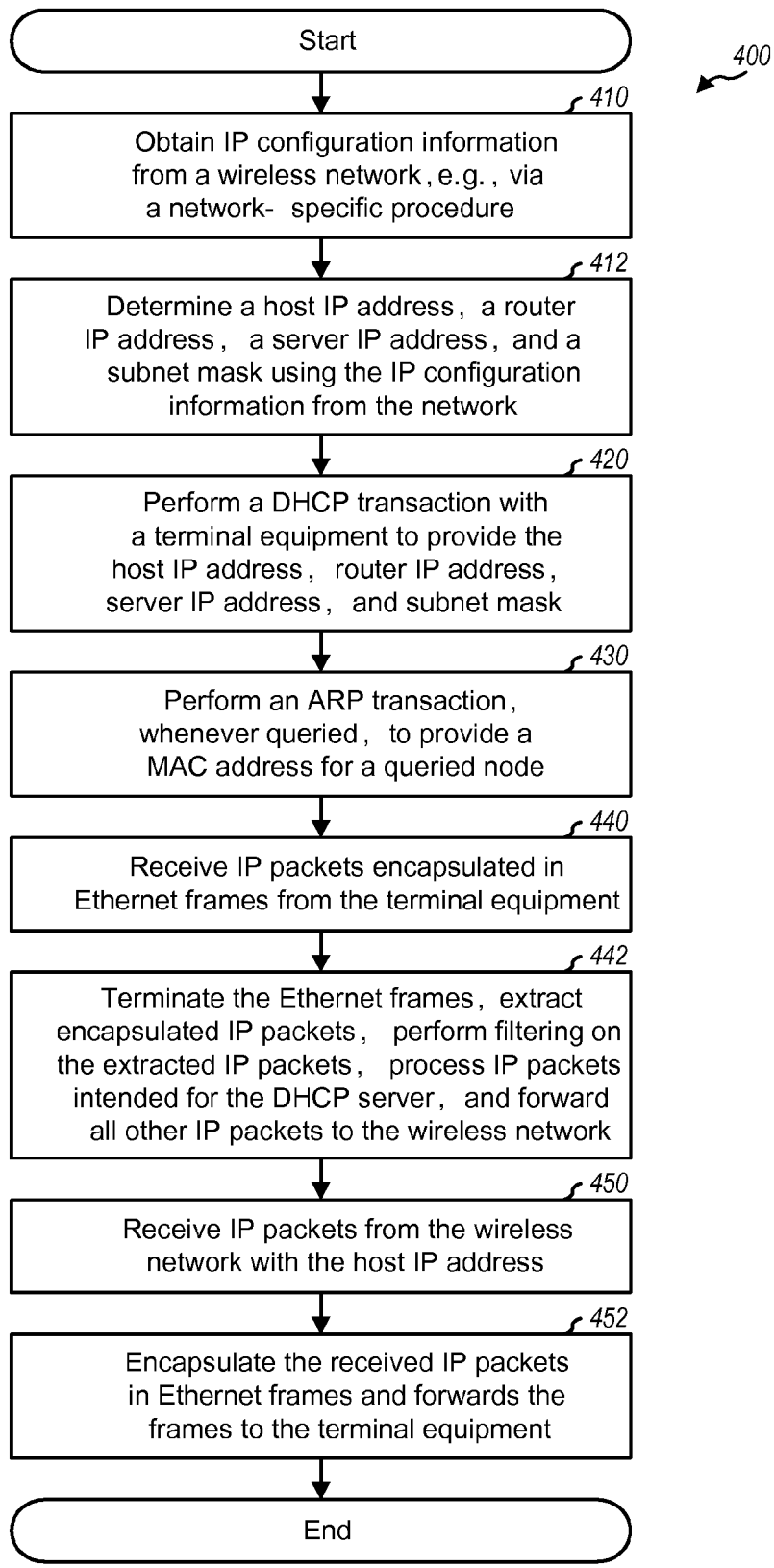
FIG. 4 shows a process performed by the wireless device to dynamically configure IP and to support IP connectivity for the terminal equipment.

FIG. 4 shows a flow diagram of a process 400 performed by wireless device 120 to dynamically configure IP and to support IP connectivity for terminal equipment 110. Initially, the wireless device obtains IP configuration from the wireless network, e.g., by performing a network-specific procedure with the wireless network (block 410). For example, in a 3GPP2-based network, the wireless device may obtain an assignment of a dynamic IP address via a PPP session with IP gateway 150. From block 410, the wireless device may obtain the dynamic IP address assigned by the wireless network to the wireless device for use in a data session, the gateway IP address, and a subnet mask. The wireless device may also obtain none, one, or any combination of these items from the wireless network. The wireless device may obtain IP configuration from the wireless network, for example, in response to receiving a DHCP message from the terminal equipment, upon receiving an indication (e.g., from a wireless user at the terminal equipment) to initiate a data session, and so on.

The wireless device then determines a host IP address, a router IP address, a server IP address, and a subnet mask (block 412). The host IP address may be the dynamic IP address assigned by the wireless network to the wireless device. The host IP address may also be an IP address that is statically configured on the wireless device, e.g., during activation or via some other mechanism. The router IP address may be the gateway IP address provided by the wireless network. The router IP address may also be an IP address that the wireless device spoofs (i.e., fakes), if the gateway IP address is not obtained from the wireless network or not in the subnet as the host IP address. The server IP address is the IP address of the DHCP server and is a spoofed IP address. Table 1 lists the various IP addresses and their descriptions.

TABLE 1

| IP Addresses | Description |
| --- | --- |
| Host IP Address | IP address assigned to, and used by, the terminal equipment as its own IP address. |
| Router IP Address | IP address advertised to the terminal equipment for use by the terminal equipment to send IP packets to hosts located outside of the subnet. |
| Gateway IP Address | IP address of the IP gateway in the wireless network. |
| Server IP Address | IP address of a DHCP server, which is used by the terminal equipment to send DHCP messages. |

The wireless device also spoofs a subnet mask, if none was obtained from the wireless network. The router IP address, server IP address, and subnet mask may be obtained as described below.

The wireless device (acting as the DHCP server) then performs a DHCP transaction with the terminal equipment (acting as the DHCP client). Via this DHCP transaction, the wireless device provides to the terminal equipment (1) the host IP address that the terminal equipment will use as its own IP address (if one is needed), (2) the router IP address that the terminal equipment will use to send IP packets, (3) the server IP address, which is the IP address of the DHCP server and is used by the terminal equipment to send DHCP messages, and (4) the subnet mask for the subnet in which the host IP address belongs (block 420). The wireless device may also provide other configuration information to the terminal equipment as part of the DHCP transaction, as described below.

If any of the current IP configuration changes (e.g., the host IP address, the router IP address, and/or the subnet mask changes), then the terminal equipment is provided with new IP configuration. For example, a new subnet mask may be determined if the host IP address and/or the router IP address change. The terminal equipment may not be aware of the need to obtain the new IP configuration from the wireless device. The terminal equipment may be triggered to initiate a DHCP transaction to obtain the new IP configuration. This may be achieved, for example, by spoofing as if the Ethernet (LAN) connection has been disconnected and then reconnected. This disconnection would trigger the terminal equipment to request new IP configuration from the wireless device acting as the DHCP server.

The wireless device (acting as a proxy for all nodes on the subnet except for the terminal equipment) also performs an Address Resolution Protocol (ARP) transaction, whenever queried by the terminal equipment, to provide a MAC address for a queried node to the terminal equipment (block 430). Blocks 420 and 430 are described in further detail below. The terminal equipment uses the IP addresses and MAC addresses to send out data.

Thereafter, the wireless device acts as both the DHCP server and the router to provide IP connectivity. The wireless device receives IP packets encapsulated in Ethernet frames from the terminal equipment (block 440). The wireless device performs Ethernet termination processing on the Ethernet frames received from the terminal equipment, extracts the IP packets encapsulated in the Ethernet frames, performs filtering on the extracted IP packets, processes IP packets intended for the DHCP server, and forwards all other IP packets to the wireless network (block 442). The wireless device also receives IP packets from the wireless network with the host IP address as the destination IP address (block 450). The wireless device encapsulates these received IP packets in Ethernet frames and forwards the Ethernet frames to the terminal equipment (block 452).

Figure 5:
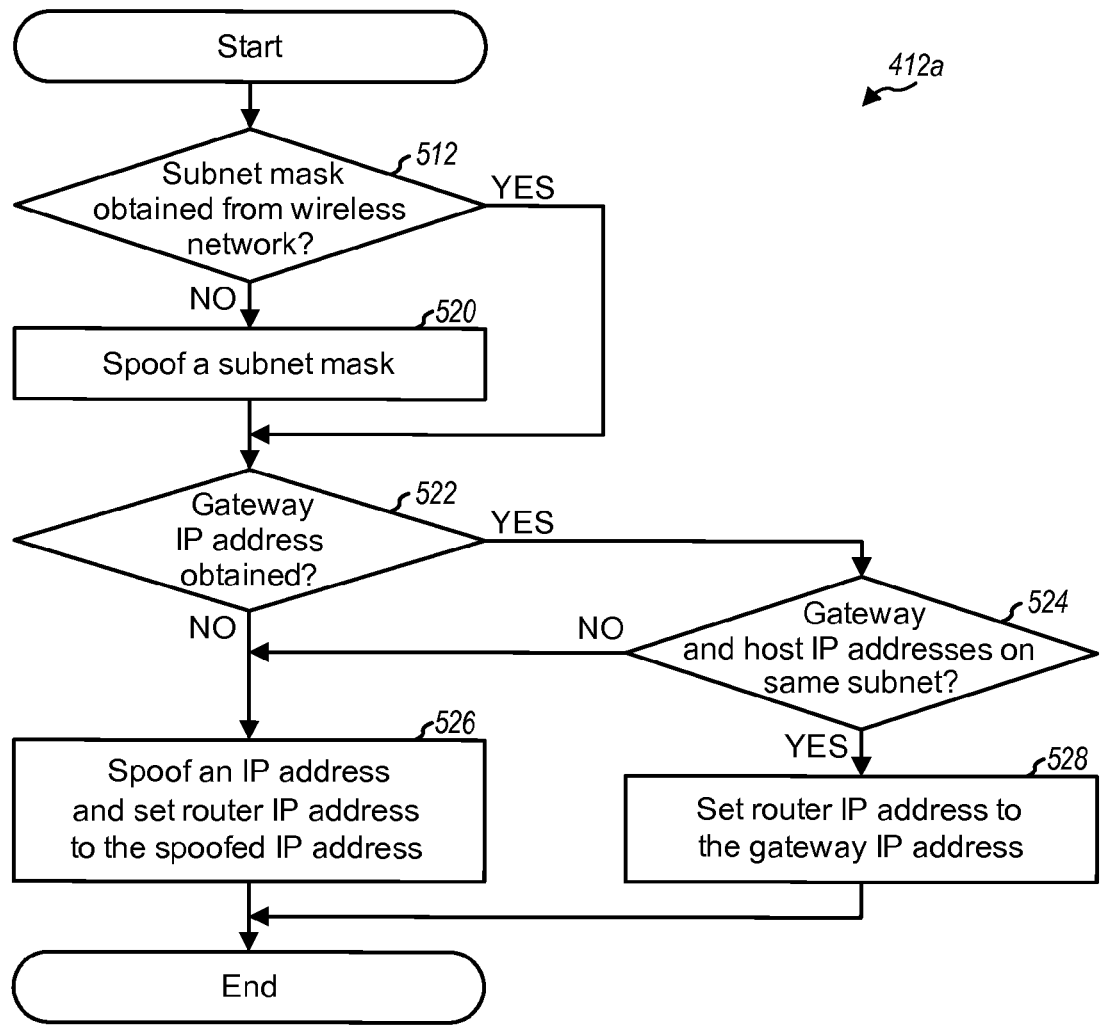
FIG. 5 shows a process to obtain the router IP address and the subnet mask.

FIG. 5 shows a flow diagram of a process 412a for determining the router IP address and the subnet mask. The wireless device may perform process 412a for block 412 in FIG. 4. Initially, the wireless device determines whether a subnet mask was obtained from the wireless network (which is called the "actual" subnet mask) (block 512). If the actual subnet mask was obtained, then the wireless device uses this subnet mask and proceeds to block 522. Otherwise, the wireless device spoofs (i.e., makes up) a subnet mask (block 520), as described below, and then proceeds to block 522.

In block 522, the wireless device determines whether the gateway IP address was obtained from the wireless network. If the answer is 'no', then the wireless device spoofs an IP address, as described below, and sets the router IP address to the spoofed IP address (block 526). If the gateway IP address was obtained (i.e., the answer is 'yes' for block 522), then the wireless device determines whether the gateway IP address and the host IP address are on the same subnet (block 524). This determination may be made using the actual subnet mask obtained from the wireless network or the spoofed subnet mask obtained in block 520. If the gateway IP address and host IP address are on the same subnet, then the wireless device sets the router IP address to the gateway IP address (block 528). Otherwise, the wireless device proceeds to block 526 to spoof an IP address for the router IP address. A spoofed subnet mask and a spoofed IP address may be obtained as described below.

As noted above, the DHCP client typically expects the host IP address and router IP address to belong in the same subnet. Thus, as shown in FIG. 5, the wireless device uses the gateway IP address as the router IP address if (1) the gateway IP address is provided by the wireless network and (2) the gateway IP address and host IP address belong in the same subnet. The host IP address and gateway IP address may be assumed to belong in the same subnet if the subnet address in the host IP address, which is obtained as: (host IP address AND subnet mask), is equal to the subnet address in the gateway IP address, which is obtained as: (gateway IP address AND subnet mask). The wireless device spoofs an IP address for the router IP address if (1) a gateway IP address is not obtained from the wireless network or (2) the gateway IP address obtained from the wireless network is not in the same subnet as the host IP address.

The subnet address for the subnet to which the host IP address belongs can be determined from the host IP address and the subnet mask. However, the wireless device may or may not receive the subnet mask from the wireless network. If the wireless network provides the subnet mask, which is typically not the case, then the wireless device can simply use this subnet mask to determine the subnet address. Otherwise, the wireless device spoofs a subnet mask, if the actual subnet mask was not obtained from the wireless network.

The wireless device may spoof a subnet mask in several manners. In a first embodiment, the wireless device derives a spoofed subnet mask for the host IP address based on the class of the IP address. The class of the host IP address may be determined based on the highest order bit(s) for the IP address, as shown in Table 2. A class A IP address has '0' for the highest order bit (i.e., the msb), a 7-bit subnet address, and a 24-bit host address. A class B IP address has '10' for the two highest order bits, a 14-bit subnet address, and a 16-bit host address. A class C IP address has '110' for the three highest order bits, a 21-bit subnet address, and an 8-bit host address. The wireless device may derive the spoofed subnet mask for the host IP address based on its class as shown in Table 2. The first embodiment provides the largest possible subnet for a given host IP address.

TABLE 2

| Class | Condition | Subnet Mask |
|---|---|---|
| Class A | highest order bit of IP address = 0 | 255.0.0.0 |
| Class B | two highest order bits = 10 | 255.255.0.0 |
| Class C | three highest order bits = 110 | 255.255.255.0 |

In a second embodiment, the wireless device derives a spoofed subnet mask based on classless subnetting. The IP address space for any given class may be divided into smaller subspaces using IP subnetting. For example, a subnet may be formed within class B having a 19-bit subnet address, a 10-bit node address that can range from 0 through 1022 (1023 is the broadcast address), and an actual subnet mask of 255.255.252.0. Using the first embodiment, the subnet mask would be given as 255.255.0.0, which is larger than the actual subnet mask of 255.255.252.0. The larger spoofed subnet mask results in more IP addresses falling in the subnet. For the example above, the spoofed subnet mask covers a 16-bit node address range of 0 through 65,535 while the actual subnet mask covers a 10-bit node address range of 0 through 1023. The larger spoofed subnet mask results in the wireless device having to proxy for more IP addresses for ARP, as described below, but is not detrimental to the dynamic IP configuration techniques described herein.

Figure 6:
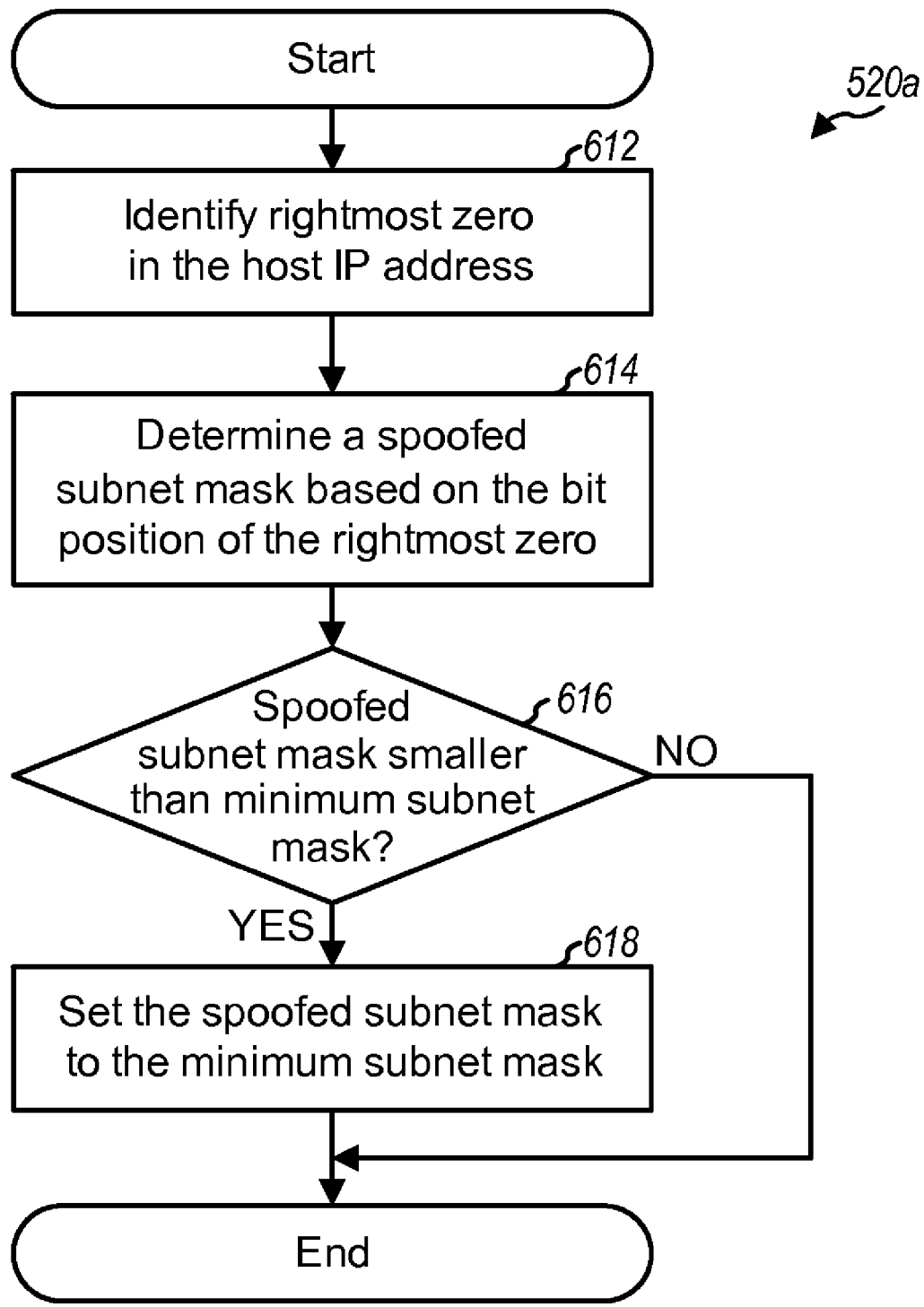
FIG. 6 shows a process to obtain a spoofed subnet mask.

FIG. 6 shows a flow diagram of a process 520a to determine the smallest possible spoofed subnet mask for a given host IP address, in accordance with one implementation of the second embodiment. Process 520a may also be used for block 520 in FIG. 5. Initially, the rightmost zero ('0') bit in the host IP address is identified (block 612). This may be achieved by expressing the host IP address in binary form, starting from the lsb position of the IP address, and traversing toward the msb position until a zero ('0') is encountered. This rightmost zero may be used as the msb of a spoofed node address, which has this zero as the msb and all ones to the right of this zero. This spoofed node address is the smallest possible non-broadcast node address, since a node address that is one bit smaller than this spoofed node address would have all ones and would be a broadcast address. The more significant bits in the host IP address to the left of the rightmost zero may be considered as belonging to the subnet address. The spoofed subnet mask is then determined based on the bit position of the rightmost zero (block 614). The spoofed subnet mask contains a one ('1') for each bit in the IP address that is more significant than the rightmost zero.

A determination is then made whether the spoofed subnet mask is smaller than a minimum subnet mask (block 616). The smallest spoofed subnet should support a minimum of two valid IP addresses (which are different from the broadcast address)—one for the host IP address and another for the router IP address. A subnet mask of 255.255.255.254 supports only one valid IP address of <Subnet Addr> <0>, since the IP address of <Subnet Addr> <1> is the broadcast address for the subnet. A subnet mask of 255.255.255.252 supports three valid IP addresses plus the broadcast address and may thus be used as the minimum subnet mask. If the spoofed subnet mask is smaller than the minimum subnet mask, as determined in block 616, then the spoofed subnet mask is set to the minimum subnet mask (block 618). The process then terminates.

The wireless device may spoof an IP address, if needed, based on the actual or spoofed subnet mask and the host IP address. The wireless device obtains the subnet address (Subnet Addr) by performing the logical operation (host IP address AND subnet mask), discarding all bits of the AND result corresponding to zeros in the subnet mask, and setting the Subnet Addr to all bits of the AND result corresponding to ones in the subnet mask. The wireless device may then form a spoofed IP address as <Subnet Addr> <0>. If the spoofed IP address is the same as the host IP address, then the wireless device may form another spoofed IP address as <Subnet Addr> <1>. In any case, the wireless device obtains two valid IP addresses (for the host IP address and the router IP address) in the subnet defined by the (actual or spoofed) subnet mask.

Since a router may also perform the function of a DHCP server, the wireless device can act as both the router and the DHCP server for the terminal equipment. The wireless device may use the same IP address for both the router IP address and the server IP address.

For clarity, three examples for determining the subnet mask of a given host IP address and spoofing an IP address for the router IP address are given below. For these examples, the first zero in the least-most significant bit position of the host IP address is bolded and underlined. For example 3, the spoofed subnet mask obtained from the host IP address is smaller than the minimum subnet mask, and is thus set equal to the minimum subnet mask. Also for example 3, the spoofed IP address is obtained with a node address of <1> (instead of <0>) since a spoofed IP address with <0> is equal to the host IP address.

EXAMPLE 1

Host IP address=129.46.217.49=10000001.00101110. 11011001.00110001
Subnet-mask=255.255.255.252=11111111.11111111.11111111. 11111100
Subnet address=10000001.00101110.11011001.001100
Node address=01
Spoofed IP address=129.46.217.48=10000001.00101110. 11011001.00110000

EXAMPLE 2

Host IP address=129.46.217.47=10000001.00101110.
  11011001.00101111
Subnetmask=255.255.255.224=11111111.11111111.
  11111111.11100000
Subnet address=10000001.00101110.11011001.001
Node address=01111
Spoofed IP address=129.46.217.48=10000001.00101110.
  11011001.00100000

EXAMPLE 3

Host IP address=129.46.217.32=10000001.00101110.
  11011001.00100000
Subnetmask=255.255.255.252=11111111.11111111.
  11111111.11111100
Subnet address=10000001.00101110.11011001.0010000
Node address=00
Spoofed IP address=129.46.217.33=10000001.00101110.
  11011001.00100001

Figure 7:
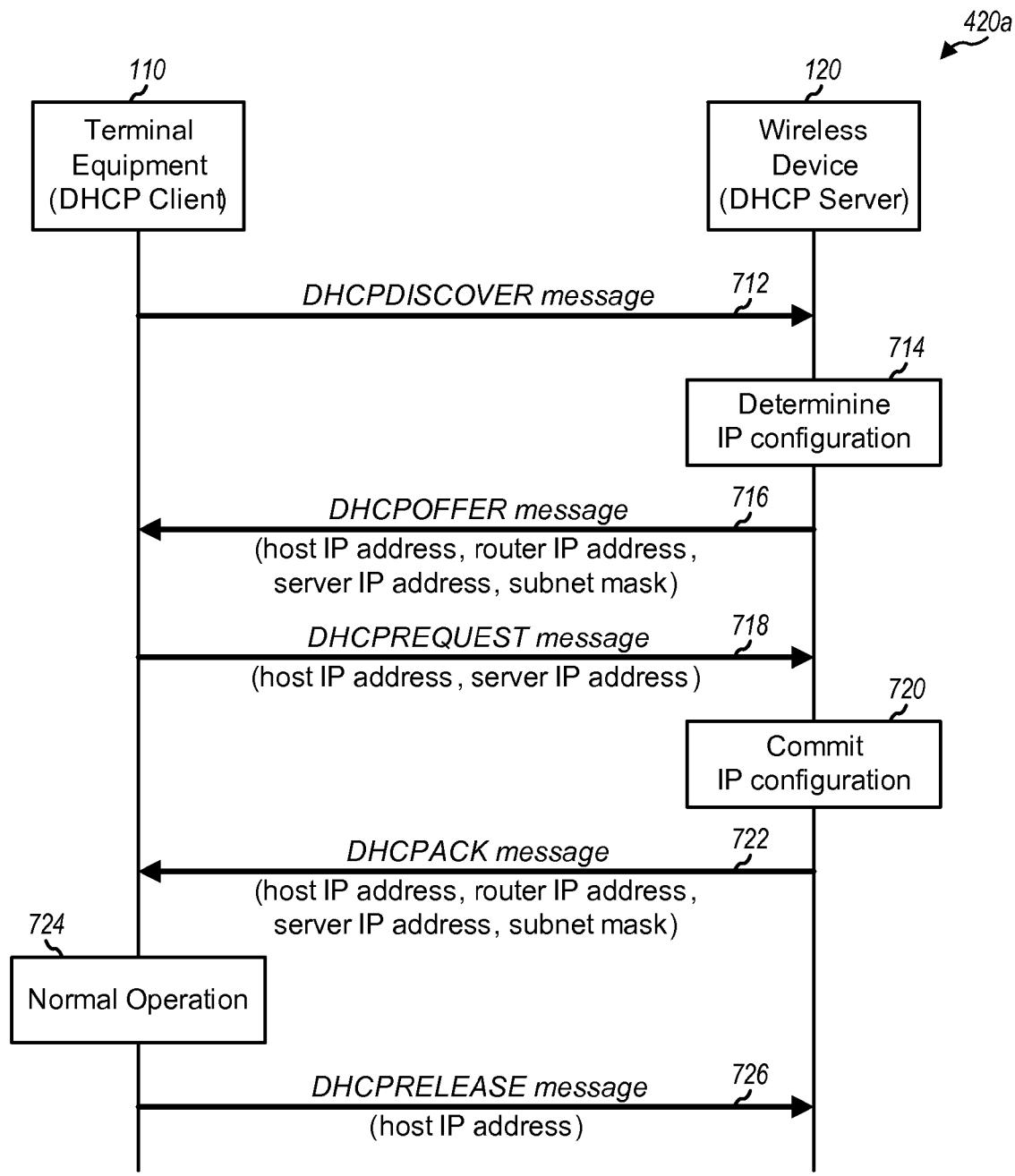
FIG. 7 shows a DHCP process performed by the wireless device and the terminal equipment to dynamically configure IP for the terminal equipment.

FIG. 7 shows a signal flow for a process 420a performed by wireless device 120 and terminal equipment 110 to dynamically configure IP for the terminal equipment. Process 420a may be used for block 420 in FIG. 4.

The terminal equipment, acting as a DHCP client, initiates a DHCP transaction by broadcasting a DHCPDISCOVER message, which may request for an IP address for use by the terminal equipment (step 712). A DHCP message may be sent as a UDP datagram, and a Source Port field in a UDP header may be set to '67' to indicate that the message is from a DHCP server and to '68' to indicate that the message is from a DHCP client. A Destination Port field in the UDP header may similarly be set to '67' or '68' to indicate that the intended recipient of the message is the DHCP server or DHCP client, respectively. The wireless device performs filtering on IP packets received from the terminal equipment and can detect IP packets for DHCP messages based on the source and destination port numbers in the UDP header, a value (for UDP) in a Protocol field of the IP header, and/or some other filter parameters.

Upon receiving the DHCPDISCOVER message, the wireless device may obtain IP configuration from the wireless network, e.g., by performing a network-specific procedure with the wireless network, if this information is not already available (step 714). The wireless device may also use (1) a preconfigured IP address that is statically assigned to the wireless device or (2) a private IP address that is spoofed by the wireless device. The wireless device, acting as a DHCP server, then responds by sending to the terminal equipment a DHCPOFFER message (block 716), which contains the following:

Host IP address—set to the static or dynamic IP address assigned to the wireless device.
  Router IP address—set to either the gateway IP address or the spoofed IP address obtained as described above.
  Server IP address—set to the router IP address.
  Subnet mask—set to either the actual subnet mask obtained from the wireless network or the spoofed subnet mask.

In a LAN environment, multiple DHCP servers may receive the DHCPDISCOVER message broadcast by the terminal equipment, and the terminal equipment may receive multiple DHCPOFFER messages from these DHCP servers. The terminal equipment would then select one of the DHCP servers to request IP configuration. For the deployment shown in FIG. 1, the wireless device intercepts and processes all DHCP messages from the terminal equipment. As a result, the terminal equipment receives the DHCPOFFER message from only one DHCP server, which is being spoofed by the wireless device. The terminal equipment then broadcasts a DHCPDISCOVER message, which identifies the DHCP server selected by the terminal equipment and includes the host IP address and the server IP address sent in the DHCPOFFER message (step 718). The wireless device receives the DHCPOFFER message, commits the IP configuration (e.g., the host IP address) (step 720), and replies by sending a DHCPACK message that contains all of the pertinent IP configuration (step 722). The wireless device in effect assigns its static or dynamic IP address to the terminal equipment via the DHCP transaction. The terminal equipment thereafter uses the IP configuration in the normal manner, as if connected to a LAN, and exchanges data using this IP configuration (step 724, which corresponds to blocks 440 through 452 in FIG. 4). The terminal equipment may relinquish the host IP address by sending a DHCPRELEASE message to the DHCP server (step 726).

The router IP address may be the gateway IP address or a spoofed IP address. If the router IP address is the gateway IP address, then the wireless device is using the IP address of another node. If the router IP address is a spoofed IP address, then the wireless device may be using the IP address of another node.

To minimize the impact caused by duplicate IP address usage, the wireless device performs IP packet filtering to detect for IP packets carrying DHCP messages (or simply, DHCP packets) intended for the DHCP server. These DHCP packets may be detected based on (1) the server IP address in the Destination Address field of the IP header and (2) the UDP port number in the Destination Port field of the UDP header. The DHCP packets are passed up the protocol stack for processing by a DHCP server engine within the wireless device. For all other IP packets received from the terminal equipment with the router IP address in the Destination Address field, the wireless device forwards these IP packets to the wireless network. Thus, even if the wireless device spoofs an IP address that happens to be another node's IP address, this node would still receive all IP packets (except for the DHCP packets) destined for this IP address. Since a terminal equipment attached to a wireless device normally does not need to send DHCP packets over a wireless network to a DHCP server in the network, the interception of DHCP packets by the wireless device is not problematic.

If the NIC-Em at the terminal equipment implements IP over Ethernet as shown in FIG. 2, which is often the case, then the NIC-Em requires a MAC address for each destination IP address to which the NIC-Em desires to send data. If the destination IP address belongs in the same subnet as the NIC-Em, which can be determined from the host IP address and the subnet mask obtained from the dynamic IP configuration, then the NIC-Em sends data to this IP address directly. If the destination IP address is outside of the subnet, then the NIC-Em typically sends data to this IP address via the router, using the router IP address obtained from the IP configuration.

The NIC-Em typically maintains an ARP table that contains an entry for each IP address to which the NIC-Em has sent data and the IP address belongs to the same subset as the host IP address. Each table entry contains the IP address and an associated MAC address. To transmit data to a given destination IP address, the NIC-Em forms an IP packet with that destination IP address, obtains the MAC address associated with this IP address from the ARP table, forms an Ethernet frame with the associated MAC address as the destination MAC address, and encapsulates the IP packet in the payload of the Ethernet frame, e.g., as shown in FIG. 3. A device whose MAC address matches the destination MAC address would receive the Ethernet frame and decapsulate IP packet from the Ethernet frame. The device then would either (1) process the IP packet, if the device is the intended destination of the IP packet, or (2) forward the IP packet to the next network element.

If the NIC-Em does not have an ARP entry for a given IP address within the same subnet as the host IP address, then the NIC-Em broadcasts an Ethernet frame for an ARP request. This ARP request includes the IP address for which the MAC address is being sought (which is also called the "queried" IP address). A device that can receive IP packets with the queried IP address would then respond by sending to the NIC-Em an Ethernet frame for an ARP reply. This ARP reply includes the MAC address of the device that sent the reply and that can receive IP packets with the queried IP address. The NIC-Em receives the ARP reply, extracts the MAC address from the ARP reply, and stores the MAC address in the ARP table for future use. If the NIC-Em desires to send data to an IP address outside of the subnet, the NIC-Em first sends the data to the router on the subnet. In order to send the data via Ethernet, the NIC-Em needs the MAC address of the router. If the NIC-Em does not have an ARP entry for the router IP address, then the NIC-Em may send an ARP for the IP address of the router to obtain the MAC address of the router, which can route IP packets to the final destination IP address.

Since the wireless device terminates the Ethernet protocol for the terminal equipment, as shown in FIG. 2, the wireless device also serves as a proxy for all IP addresses in the same subnet as the terminal equipment, except for IP addresses that have been assigned to other hosts on the subnet. If the wireless device receives an ARP request from the terminal equipment for the MAC address corresponding to the router IP address, then the wireless device sends an ARP reply containing the wireless device's MAC address, since the wireless device is spoofing the router. If the wireless device receives an ARP request from the terminal equipment for the MAC address corresponding to another IP address within the same subnet, which is not the host IP address or the router IP address, then the wireless device serves a proxy for this IP address and also sends an ARP reply containing the wireless device's MAC address. The terminal equipment would then send Ethernet frames for all IP packets for IP addresses within the subnet to the wireless device, which then forwards all IP packets except those for DHCP to the wireless network.

If the wireless device is supporting only one terminal equipment for IP (e.g., via a direct connection such as a USB, an RS232/EIA232 interface, and so on), then there may be only two nodes (the router and the terminal equipment) on the subnet being spoofed by the wireless device, and the wireless device can receive all IP packets from the terminal equipment and either terminate or forward these IP packets. If the wireless device is supporting multiple terminal equipments simultaneously for IP (e.g., via an IEEE-802.11 network or a Bluetooth PAN), then the wireless device keeps track of all IP addresses assigned to hosts on the subnet. The wireless device would only proxy for IP addresses that have not been assigned to any host on the subnet and would only send ARP replies for ARP requests for unassigned IP addresses.

The wireless device may also send an ARP request to the terminal equipment to obtain the MAC address of the terminal equipment.

As shown in FIG. 4, the wireless device performs various functions so that the terminal equipment can operate in the normal manner as if in a LAN environment. The terminal equipment need not be aware that IP configuration is being obtained via a wireless network. The wireless device spoofs the DHCP server and provides the terminal equipment with the IP configuration (e.g., the host IP address, router IP address, server IP address, and subnet mask). As part of configuring the terminal equipment, the wireless device acting as the DHCP server may also provide to the terminal equipment other parameters that the terminal equipment may use for exchanging data with the network. Some examples of such parameters include Domain Name Server (DNS) IP addresses, default Domain Name, other Name Server IP addresses, Interface Maximum Transmit Unit (MTU), and so on. All of these parameters are known in the art. The wireless device may obtain these parameters from the network via network specific mechanisms and pass these parameters to the terminal equipment by encapsulating the parameters in a DHCP message. For example, if the wireless device is in communication with a CDMA network, then the wireless device may obtain these parameters during Point-to-Point Protocol (PPP) negotiation with the CDMA network. The wireless device also acts as a proxy for all IP addresses on the subnet and responds to ARP requests sent by the terminal equipment. The wireless device forwards IP packets exchanged between the terminal equipment and destination hosts and only intercepts and processes IP packets intended for the DHCP server. The wireless device further terminates Ethernet frames received from the terminal equipment and originates Ethernet frames to the terminal equipment.

Figure 8:
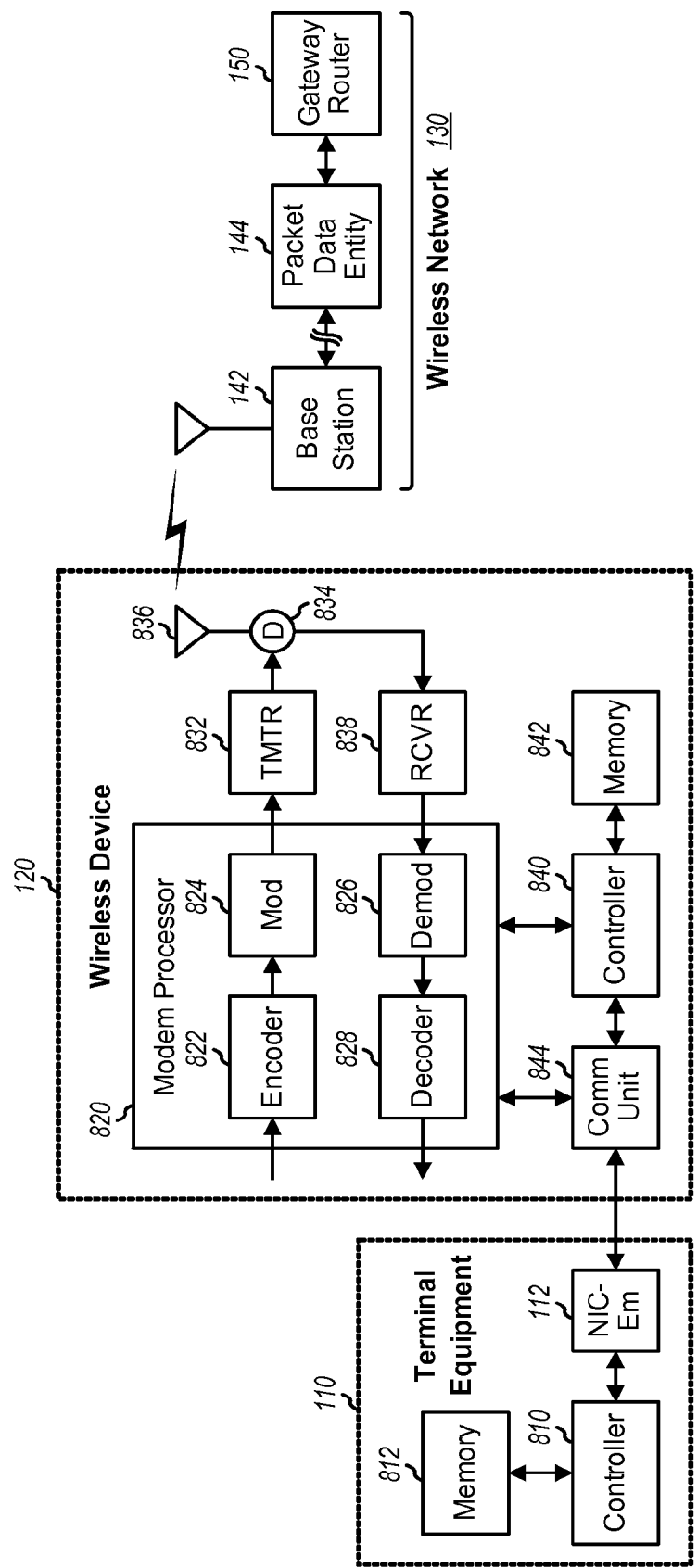
FIG. 8 shows a block diagram of the terminal equipment and wireless device.

FIG. 8 shows a block diagram of terminal equipment 110 and wireless device 120. Terminal equipment 110 includes a controller 810, a memory 812, and NIC-Em 112. Controller 810 performs processing for the terminal equipment and further directs the operation of various units within the terminal equipment. Controller 810 may implement the DHCP client for the dynamic IP configuration shown in FIG. 7, perform processing to send and receive IP packets, and so on. Memory unit 812 stores program code and data used by controller 810. NIC-Em 112 provides an interface to wireless device 120 and may perform processing for IP and Ethernet. NIC-Em 112 may be implemented with software (e.g., by controller 810) or hardware.

Wireless device 120 includes a wireless modem for communication with wireless network 130, a controller 840, a memory 842, and a communication (Comm) unit 844. On the transmit path of the wireless modem, data and signaling to be sent by the wireless device are processed (e.g., formatted, encoded, and interleaved) by an encoder 822 and further processed (e.g., modulated, spread/channelized, and scrambled) by a modulator (Mod) 824 to obtain a stream of data chips. A transmitter unit (TMTR) 832 then conditions (e.g., converts to analog, filters, amplifies, and frequency upconverts) the data chip stream to generate an uplink signal, which is routed through a duplexer (D) 834 and transmitted via an antenna 836. On the receive path, downlink signals transmitted by base stations in the wireless network (e.g., a CDMA or UMTS network) are received by antenna 836, routed through duplexer 834, and provided to a receiver unit (RCVR) 838. Receiver unit 838 conditions (e.g., filters, amplifies, and frequency downconverts) the received signal and further digitizes the conditioned signal to obtain data samples. A demodulator (Demod) 826 processes (e.g., descrambles, despeads/channelizes, and demodulates) the samples to obtain symbols. A decoder 828 further processes (e.g., deinterleaves and decodes) the symbols to obtain decoded data. Encoder 822, modulator 824, demodulator 826, and decoder 828 may be implemented by a modem processor 820. These units perform processing in accordance with the wireless technology (e.g., W-CDMA or IS-2000) of wireless network 130.

Controller 840 directs the operation of the various units within wireless device 120. Controller 840 may implement processes 400, 412a, and 520a shown in FIGS. 4, 5 and 6 and may implement the DHCP server for the dynamic IP configuration shown in FIG. 7. Memory unit 842 stores program code and data used by controller 840 and other units. Comm unit 844 provides an interface to terminal equipment 110 and may perform processing for IP and Ethernet.

The techniques described herein for dynamically configuring IP and for supporting IP connectivity for an attached terminal equipment may be used in conjunction with various wireless networks. These wireless networks may implement various wireless technologies such as the 3GPP2 and 3GPP families of technologies, IEEE 802.11, Bluetooth, and so on. These techniques may also be used for other existing and future wireless network technologies.

The techniques described herein may be implemented by various means. For example, these techniques may be implemented in hardware, software, or a combination thereof. For a hardware implementation, the processing units used to perform the dynamic IP configuration and to support IP connectivity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 842 in FIG. 8) and executed by a processor (e.g., controller 840). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of providing Internet Protocol (IP) connectivity for a terminal equipment coupled to a wireless device that is in communication with a wireless network, comprising:
determining a host IP address, a router IP address, and a subnet mask; and
providing the host IP address, the router IP address, and the subnet mask to the terminal equipment, wherein the host IP address, router IP address, and subnet mask are used by the terminal equipment to exchange IP packets.

2. The method of claim 1, further comprising:
receiving an IP packet from the terminal equipment; and
forwarding the IP packet to the wireless network.

3. The method of claim 1, further comprising:
receiving from the wireless network an IP packet with the host IP address as a destination IP address; and
forwarding the IP packet to the terminal equipment.

4. The method of claim 1, further comprising:
obtaining IP configuration from the wireless network, and wherein the host IP address, the router IP address, and the subnet mask are determined using the IP configuration obtained from the wireless network.

5. The method of claim 4, wherein the IP configuration obtained from the wireless network includes an IP address dynamically assigned to the wireless device by the wireless network, and wherein the host IP address is set to the dynamically assigned IP address.

6. The method of claim 1, wherein the host IP address is an IP address statically assigned to the wireless device.

7. The method of claim 4, wherein the IP configuration obtained from the wireless network includes the subnet mask.

8. The method of claim 4, wherein the IP configuration obtained from the wireless network includes the router IP address.

9. The method of claim 1, wherein the host IP address, the router IP address, and the subnet mask are provided to the terminal equipment via a Dynamic Host Configuration Protocol (DHCP).

10. The method of claim 9, further comprising:
providing a server IP address to the terminal equipment, the server IP address being an IP address for a DHCP server implemented by the wireless device.

11. The method of claim 10, wherein the server IP address is set to the router IP address.

12. The method of claim 10, further comprising:
receiving an IP packet from the terminal equipment;
determining whether the IP packet is intended for the DHCP server; and
processing the IP packet at the wireless device if the IP packet is intended for the DHCP server.

13. The method of claim 12, further comprising:
sending a DHCP response back to the terminal equipment if the IP packet is intended for the DHCP server.

14. The method of claim 1, further comprising:
providing to the terminal equipment a Domain Name Server (DNS) IP address, a default Domain Name, an other Name Server IP address, an Interface Maximum Transmit Unit (MTU), or a combination thereof.

15. The method of claim 1, further comprising:
obtaining a gateway IP address from the wireless network, the gateway IP address being an IP address for an IP gateway used to route IP packets for the wireless network; and
setting the router IP address to the gateway IP address if the gateway IP address belongs to the same subnet as the host IP address.

16. An apparatus for providing Internet Protocol (IP) connectivity for a terminal equipment coupled to a wireless device that is in communication with a wireless network, the apparatus comprising:
A processor that determines a host IP address, a router IP address, and a subnet mask; and
A transmitter that provides the host IP address, the router IP address, and the subnet mask to the terminal equipment, wherein the host IP address, router IP address, and subnet mask are used by the terminal equipment to exchange IP packets.

17. An apparatus for providing Internet Protocol (IP) connectivity for a terminal equipment coupled to a wireless device that is in communication with a wireless network, the apparatus comprising:
 means for determining a host IP address, a router IP address, and a subnet mask; and
 means for providing the host IP address, the router IP address, and the subnet mask to the terminal equipment, wherein the host IP address, router IP address, and subnet mask are used by the terminal equipment to exchange IP packets.

18. A computer program product, comprising:
 non-transitory computer-readable medium embodying codes for providing Internet Protocol (IP) connectivity for a terminal equipment coupled to a wireless device that is in communication with a wireless network, the codes comprising:
 codes for causing a computer to determine a host IP address, a router IP address, and a subnet mask; and
 codes for causing the computer to provide the host IP address, the router IP address, and the subnet mask to the terminal equipment, wherein the host IP address, router IP address, and subnet mask are used by the terminal equipment to exchange IP packets.

* * * * *